United States Patent
Jang et al.

(10) Patent No.: US 10,325,062 B2
(45) Date of Patent: *Jun. 18, 2019

(54) METHOD AND DEVICE FOR GENERATING ENGINEERING TOPOLOGY OF DIGITAL SUBSTATION

(71) Applicant: Korea Electric Power Corporation, Seoul (KR)

(72) Inventors: Byung Tae Jang, Daejeon (KR); Nam Ho Lee, Daejeon (KR); Yong Ho An, Daejeon (KR); Jong Kee Choi, Daejeon (KR); Jeong Yeol Han, Daejeon (KR); You Jin Lee, Daejeon (KR); Eung Bo Shim, Daejeon (KR); Dong Il Lee, Daejeon (KR)

(73) Assignee: KOREA ELECTRIC POWER CORPORATION, Seoul (KR)

( * ) Notice: Subject to any disclaimer, the term of this patent is extended or adjusted under 35 U.S.C. 154(b) by 13 days.

This patent is subject to a terminal disclaimer.

(21) Appl. No.: 15/441,727

(22) Filed: Feb. 24, 2017

(65) Prior Publication Data

US 2017/0169144 A1     Jun. 15, 2017

Related U.S. Application Data

(63) Continuation of application No. 14/418,338, filed as application No. PCT/KR2013/002252 on Sep. 26, 2012, now Pat. No. 10,169,528.

(30) Foreign Application Priority Data

Sep. 26, 2012 (KR) .................. 10-2012-0106904

(51) Int. Cl.
*G06F 17/50*     (2006.01)
*G06Q 30/00*     (2012.01)
*G06Q 50/06*     (2012.01)

(52) U.S. Cl.
CPC .......... *G06F 17/509* (2013.01); *G06F 17/50* (2013.01); *G06Q 30/018* (2013.01); *G06Q 50/06* (2013.01)

(58) Field of Classification Search
CPC ..... G06F 17/509; G06Q 50/06; G06Q 30/018
See application file for complete search history.

(56) References Cited

U.S. PATENT DOCUMENTS

| 2008/0234872 | A1 | 9/2008 | Vetter et al. |
| 2009/0070051 | A1 | 3/2009 | Vetter et al. |
| 2010/0250622 | A1 | 9/2010 | Hossenlop |

FOREIGN PATENT DOCUMENTS

| KR | 10-0695021 B1 | 3/2007 |
| KR | 10-2009-0001508 A | 1/2009 |
| KR | 10-0901319 B1 | 6/2009 |

OTHER PUBLICATIONS

U.S. Office Action dated Aug. 25, 2017 issued in U.S. Appl. No. 14/418,338.

(Continued)

*Primary Examiner* — Rehana Perveen
*Assistant Examiner* — Steven W Crabb
(74) *Attorney, Agent, or Firm* — Morgan Lewis & Bockius LLP

(57) ABSTRACT

The present invention relates to a method and device for generating an engineering topology of a digital substation. The method may include: generating, by a single line diagram generation module, a single line diagram of the digital substation based on input information regarding a plurality of substation component devices and connection relations therebetween; converting, by a topology conversion module, the single line diagram of the digital substation into an engineering topology conforming to international standards by use of conversion conditions stored in a topology component management module; verifying, by a topol- (Continued)

ogy verification module, whether the engineering topology is suitable for the digital substation based on the international standards; and generating, by an international standard file generation module, a single line diagram engineering file of the digital substation as a system specification description (SSS) by use of the verified engineering topology.

7 Claims, 5 Drawing Sheets

(56) References Cited

OTHER PUBLICATIONS

Kim, et al., "Development of IEC 61850 Based Substation Engineering Tools With IEC61850 Schema Library," Smart Grid and Renewable Energy, Aug. 2011, vol. 2, pp. 271-277.
Rim, et al., "Development of an Intelligent Station HMI in IEC 61850 Based Substation," Journal of Electrical Engineering and Technology, vol. 4, No. 1, pp. 13-18 (2009).
N. Higgins, et al., "Distributed Power System Automation with IEC 61850, IEC 61499, and Intelligent Control," IEEE Transaction on Systems Man and Cybernetics Part C (Applications and Reviews), Feb. 2011.
International Search Report PCT/KR2013/002252 dated Jun. 24, 2013 with full Englisn translation.
Office Action Korean Patent Application No. 10-2012-0106904 dated Oct. 27, 2013.
Nam-Ho Lee et al., "Performance Analysis of the GOOSE Transmission of an IED Considering Network Redundancy", Journal of the Korean Institute of Illuminating and Electrical Installation Engineers, vol. 23, No. 10, pp. 75-80, Oct. 2009.
Yong-Ho an et al., "Study on IED Engineering Method Based on IEC 61850", Journal of 2011 Summer Conference in KIEE, Jul. 20-22, 2011, pp. 778-779.
N.H. Lee et al., "A Study on the design of Single Line Diagram of the Digital Substation based on the IEC 61850 engineering file", Journal of 2012 Summer Conference in KIEE and Korea Research for Electric Power and Economic nstitutes, May 3-4, 2012, pp. 7-8.
N. H. Lee et al., "A Study on the Implementation of the Test Procedures and International Standard based Engineering of the Digital Substation", Journal of 2012 Summer Conference in KIEE, pp. 371-372 Jul. 18-20, 2012.
Luc Hossenlopp et al., "Toward an Auto-Configuration Process Leveraging the IEC 61850 Standard", 21st International Conference on Electricity Distribution, Paper No. 0138, Frankfurt, Jun. 6-9, 2011, pp. 1-4.
N.H. Lee et al., "A Study on the design of Single Line Diagram of the Digital Substation based on the IEC 61850 engineering file", Journal of 2012 Summer Conference in KIEE and Korea Research for Electric Power and Economic Institutes, May 3-4, 2012, pp. 7-8.
Decision to Grant Patent Korean Patent Application No. 10-012-0106904 filed dated Jan. 10, 2014 with English translation.
U.S. Office Action dated Jan. 31, 2018 issued in U.S. Appl. No. 14/418,338.

METHOD AND DEVICE FOR GENERATING ENGINEERING TOPOLOGY OF DIGITAL SUBSTATION

CROSS-REFERENCE TO RELATED APPLICATIONS

This Application is a Continuation Application of U.S. Ser. No. 14/418,338 filed Jan. 29, 2015, which is the U.S. National Phase of PCT/KR2013/002252 filed Mar. 19, 2013, which claims priority to Korean Patent Application No. 10-2012-0106904 filed Sep. 26, 2012. The subject matter of each is incorporated herein by reference in entirety.

TECHNICAL FIELD

The present invention relates to a method and device for generating an engineering topology of a digital substation and, in particular, to a method and device for generating an engineering topology of a digital substation that enable engineering tasks for a digital substation based on international standards to be performed at the system level rather than at the existing level of a unit device and enable power engineers to automatically generate an engineering topology of a digital substation conforming to complex international standards so as to make it possible to perform engineering design tasks for digital substations attracting worldwide attention in a rapid and accurate manner.

BACKGROUND ART

Background technologies of the present invention are disclosed in Korean Patent Gazette No. 0695021 (published on Mar. 8, 2007).

Recently, to protect and control substation devices connected to power systems, technologies for internationally standardized substation systems, which enable effective utilization of data through digitalization of data and networks based on information technology (IT), have been actively developed.

International standard IEC 61850 for substation automation systems deals with data models enabling all types of substation information to be represented in object data, and communication interfaces enabling message transmission and reception between intelligent electronic devices (IED) constituting the substation automation system, higher layer operation systems and gateways. Such data models and communication interfaces of a substation are described by Substation Configuration Description Language (SCL) in the form of standardized XML documents, which is specified in part 6 of IEC 61850 (IEC 61850-6). SCL documents are divided into four types of documents: IED Capability Description (ICD), Substation Specification Description (SSD), Substation Configuration Description (SCD) and Configured IED Description (CID). The ICD document contains information on data models and communication interfaces of an IED and is generated for each server device. The SSD document represents definitions and connection relationships of substation equipment based on single-line diagrams of the substation and arranges the information model needed for substation operation as logical nodes.

FIG. 1 is a conceptual diagram illustrating engineering of a substation automation system in compliance with the international standard IEC 61850. As shown in FIG. 1, IEC 61850 substation engineering includes combining ICD information describing the substation automation system with SSD information related to single-line diagrams, recording information regarding engineering settings for data transport of the substation automation system (e.g. reports and Generic Object Oriented Substation Events (GOOSE)), and creating the SCD file associating SSD logical nodes with corresponding IED logical nodes. Generation of IEC 61850 engineering documents including ICD, SSD and SCD information requires understanding of a vast amount of international standards and creation of complex XML documents. Because of this difficulty, IEC 61850 engineering documents are often automatically generated by entering the engineering design of a digital substation into a computer-programmed engineering tool, rather than manual processing of a user.

The generated IEC 61850 engineering documents cause an IED constituting the physical digital substation and a higher layer operation system to recognize XML documents and to carry out data models and communication services described in the documents, enabling them to perform information exchange and operation of the digital substation.

Currently, particularly in European countries and China, hundreds of IEC 61850 based digital substations have been completed or are under construction. In South Korea, new substations to be built after 2012 are expected to be constructed as an IEC 61850 based digital substation, starting with a Sancheong substation carried out as a pilot project. However, IEC 61850 substation engineering currently applied in the field deals with generation of SCD files using ICD information only except for SSD information describing the substation topology, i.e. connections made by switches. The SSD file, serving as an engineering design representing the substation topology related to connections between substation facilities of a digital substation, is complex in content, and implementation thereof requires clear understanding of the overall configuration of the digital substation and associated international standards. This means that it is almost impossible for an engineer to manually generate the engineering topology from drawings of a digital substation. Hence, to complete engineering tasks for a digital substation, it is essential to develop a method and device that enable automatic generation of an engineering topology conforming to international standards by use of single-line diagrams of a digital substation.

DISCLOSURE

Technical Problem

Accordingly, it is an aspect of the present invention to provide a method and device for generating an engineering topology of a digital substation that enable engineering tasks for a digital substation based on international standards to be performed at the system level rather than at the existing level of a unit device and enable power engineers to automatically generate an engineering topology of a digital substation conforming to complex international standards so as to make it possible to perform engineering design tasks for digital substations attracting worldwide attention in a rapid and accurate manner.

Technical Solution

In accordance with one aspect of the present invention, a method for generating an engineering topology of a digital substation includes: generating, by a single line diagram generation module, a single line diagram (one line diagram) of the digital substation based on input information regarding a plurality of substation component devices and connection relations therebetween; converting, by a topology conversion module, the single line diagram of the digital substation into an engineering topology conforming to international standards by use of conversion conditions stored in a topology component management module; verifying, by a topology verification module, whether the engineering topology is suitable for the digital substation based on the international standards; and generating, by an international standard file generation module, a single line diagram engineering file of the digital substation as a system specification description (SSS) by use of the verified engineering topology.

Converting the single line diagram into an engineering topology may include: establishing connection relations between connection nodes (CN) and terminals for individual objects included in the single-line diagram of the digital substation; and representing the connection relations on a drawing in the form of an engineering topology conforming to the international standards.

Establishing connection relations between connection nodes (CN) and terminals may include: selecting an object on the single-line diagram in a preset order; retrieving the number of terminals for the selected object from the topology component management module; placing connection points between objects of the single-line diagram on the terminals of the selected object; examining search tags of all objects connected to the selected object, when an object connected to the terminal of the selected object is present; creating one connection node according to preset generation rules for connection nodes, and storing information regarding all objects connected to the terminal of the selected object at the created connection node, when all the search tags are set to "false" (unprocessed); finding a connection node having information on the selected object among created connection nodes, and configuring settings so that the found connection node is linked with the terminal of the selected object, when a search tag set to "true" (processed) is present; and repeating, for all terminals of the selected object, the steps of examining search tags, creating one connection node and storing, and finding a connection node and configuring settings.

Representing the connection relations on a drawing may include: placing an object contained in the single-line diagram of the digital substation on the drawing; finding a connection node (CN) linked with a terminal of the object; examining the search tag of the found connection node linked with the terminal;

placing the connection node on the drawing when the search tag is set to "false" (unprocessed);

linking the terminal with the placed connection node; and repeating, for all terminals of the object, the steps of examining the search tag, placing the connection node, and linking the terminal.

Verifying whether the engineering topology is suitable may include: examining whether all terminals of each object contained in the generated engineering topology are linked with a connection node; examining whether an isolated object is present among objects contained in the single-line diagram of the digital substation; examining whether a duplicate connection node is present in the generated engineering topology; and examining whether the connection node at one end of a transmission line refers to another substation at the other end.

The topology component management module may manage generation rules for connection nodes and the number of terminals connectable to the connection nodes.

In accordance with another aspect of the present invention, a device for generating an engineering topology of a digital substation includes: a single line diagram generation module that generates a single line diagram of the digital substation based on input information regarding a plurality of substation component devices and connection relations therebetween; a topology conversion module that converts the single line diagram of the digital substation into an engineering topology conforming to international standards by use of conversion conditions stored in a topology component management module; a topology verification module that verifies whether the engineering topology is suitable for the digital substation based on the international standards; and an international standard file generation module that generates a single line diagram engineering file of the digital substation as a system specification description (SSS) by use of the verified engineering topology.

For conversion of the single line diagram into the engineering topology, the topology conversion module may establish connection relations between connection nodes (CN) and terminals for individual objects included in the single-line diagram of the digital substation, and represent the connection relations on a drawing in the form of an engineering topology conforming to the international standards.

For representation of the connection relations on a drawing, the topology conversion module may place an object contained in the single-line diagram of the digital substation on the drawing, find a connection node (CN) linked with a terminal of the object, examine the search tag of the found connection node linked with the terminal, and place, when the search tag is set to "false" (unprocessed), the connection node on the drawing and link the terminal and the placed connection node together.

The topology verification module may examine whether all terminals of each object contained in the generated engineering topology are linked with a connection node, examine whether an isolated object is present among objects contained in the single-line diagram of the digital substation, examine whether a duplicate connection node is present in the generated engineering topology, and examine whether the connection node at one end of a transmission line refers to another substation at the other end.

The topology component management module may manage generation rules for connection nodes and the number of terminals connectable to the connection nodes.

Advantageous Effects

According to the present invention, the method and device that generate an engineering topology of a digital substation allow engineering tasks for a digital substation based on international standards to be performed at the system level rather than at the existing level of a unit device, and enable power engineers to automatically generate an engineering topology of a digital substation conforming to complex international standards, making it possible to perform engineering design tasks for digital substations attracting worldwide attention in a rapid and accurate manner.

According to the present invention, the method and device that generate an engineering topology of a digital substation enable automatic generation of an engineering topology of the digital substation without separate tasks by use of existing single-line diagrams of the digital substation that can be readily drawn by substation engineers.

According to the present invention, analyzing and representing a digital substation in an engineering topology perspective may create an environment in which power flowing through the substation and streams of associated digital information can be seen by not only human engineers but also a computer system. Hence, higher layer operation systems and gateway systems monitoring the overall power of the digital substation and information flows therein may be independently implemented using the engineering topology information without separate tasks. Additionally, to build a supervisory control and data acquisition (SCADA) system acting as an immediate higher layer of the digital substation in accordance with international standards such as IEC 61970, the engineering topology of the digital substation may be adjusted to realize an engineering topology of the new SCADA system.

With rapid advances in information technology and digitalization of substations, characteristics of substation engineering have evolved from hardware-centric tasks such as traditional cabling processes using electrical signals to software-centric tasks using computer programs that enable instant identification and configuration of the flow of electric power and associated information. In conformance to this trend, the method and device that generate an engineering topology of a digital substation according to the present invention enable software based performance of engineering tasks for a digital substation, ensure full interoperability between intelligent electronic devices of the digital substation according to international standards, and enable engineering tasks on the flow of electric power and information in the substation to be performed from a system-wide perspective with minimum human intervention.

BEST MODE

Figure 1:
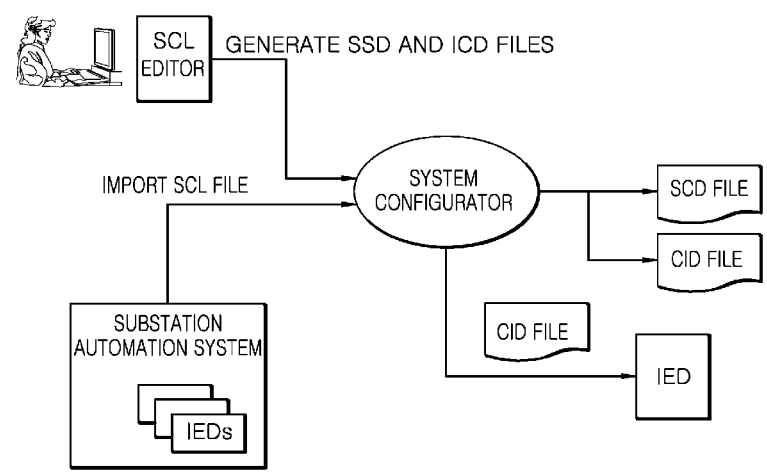
FIG. 1 is a conceptual diagram illustrating engineering of a substation automation system in compliance with the international standard IEC 61850.

Hereinafter, embodiments of the present invention will be described in detail with reference to the accompanying drawings so that those skilled in the art may carry out the embodiments with minimal effort. It should be understood that the present invention is not limited to the following embodiments and may be embodied in different ways. In the drawings, some elements not directly related to the present invention may be omitted for clarity and like components are denoted by like reference numerals.

It will be understood that the terms "comprising", "including", "having" and derivatives thereof, when used in the specification, specify the presence of stated operations and/or components, but do not preclude the presence or addition of one or more other operations and/or components unless context clearly dictates otherwise.

Figure 2:
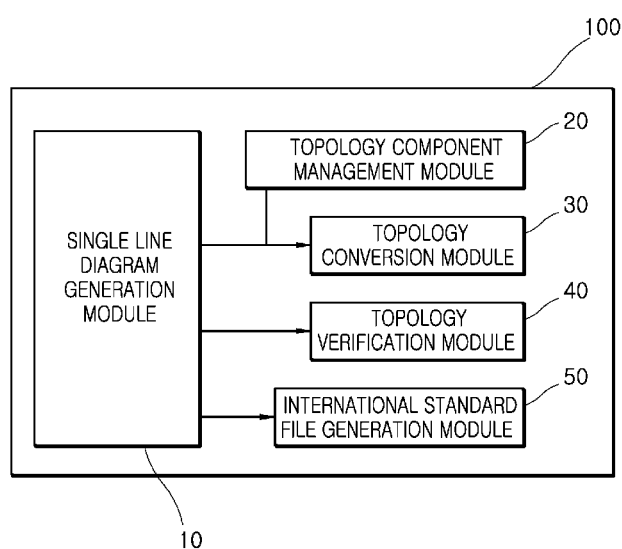
FIG. 2 illustrates a configuration of a device that generates an engineering topology of a digital substation according to an embodiment of the present invention.

FIG. 2 illustrates a configuration of a device that generates an engineering topology of a digital substation according to an embodiment of the present invention. A description of the present invention is given below with reference to FIG. 2.

As shown in FIG. 2, the device 100 for generating an engineering topology of a digital substation according to the present embodiment includes a single line diagram generation module 10 to generate a single line diagram of a digital substation based on input information regarding a plurality of substation component devices and connections therebetween, a topology conversion module 30 to convert the single line diagram of the digital substation into an engineering topology conforming to international standards by use of conversion conditions stored in a topology component management module 20, a topology verification module 40 to verify whether the engineering topology is suitable for the digital substation based on the international standards, and an international standard file generation module 50 to generate a single line diagram engineering file of the digital substation as a system specification description (SSS) by use of the verified engineering topology.

Mode for Invention

For conversion into an engineering topology, the topology conversion module 30 establishes relations between connection nodes (CN) and terminals for individual objects included in a single-line diagram of a digital substation, and represents the relations on a drawing in the form of an engineering topology conforming to international standards.

In addition, for representation in the form of an engineering topology conforming to international standards, the topology conversion module 30 arranges objects included in the single-line diagram of the digital substation on the drawing, finds a connection node linked with a terminal of each object, checks the search tag of the found connection node, and, if the search tag is set to "false" (unprocessed), places the connection node on the drawing and links the terminal and the placed connection node.

The topology verification module 40 checks whether all terminals of each object contained in the generated engineering topology are linked with a connection node, checks whether an isolated object is present among objects contained in the single-line diagram of the digital substation, checks whether a duplicate connection node is present in the generated engineering topology, and checks whether the connection node at one end of a transmission line refers to another substation at the other end.

The topology component management module 20 manages generation rules for connection nodes and the number of terminals linked with each connection node.

Operations and actions of the present embodiment having the above configuration are described in detail with reference to FIGS. 2 to 5.

A digital substation is configured to freely disseminate information through a communication network. In the digital substation, engineering tasks are performed through software-centric activities using computer programs other than hardware-centric activities using cables transmitting electrical signals. To conform to international standards such as IEC 61850, the engineering design of a digital substation has to represent the flow of information at the level of the overall substation system. To this end, the present invention utilizes a single-line diagram representing the physical configuration of a digital substation to automatically convert the topology representing system connection information into an engineering representation conforming to international standards.

As shown in FIG. 2, first, the single line diagram generation module 10 generates a single line diagram (one line diagram) of a digital substation based on input information regarding a plurality of substation component devices and connection relations therebetween. That is, the user may enter information on substation component devices including a transformer, line, switch and bus bar through a graphical input screen using a single-line diagram of a regular substation. The single line diagram generation module 10 stores connection relations (including connection points) between the substation component devices and automatically generates a single line diagram of the digital substation by use of information regarding the substation component devices and connection relations therebetween. Here, attribute values of each component device may be entered, so that a related information model may be selected through the SCL file of an intelligent electronic device (IED) performing information provision, protection and control functions of the digital substation. When a group of one or more component devices of the single-line diagram are designated as a bay having a unique name, bay attribute values of each component device may be automatically stored.

The topology component management module 20 manages generation rules for connection nodes and the number of terminals linked with each connection node. The topology component management module 20 manages conditions for converting the single-line diagram of the digital substation into an engineering topology. Here, the topology representation of the digital substation indicates design of connection information by linking a configured substation facility with a terminal, which is owned by a substation facility model to link to another external substation facility model, with a connection node as the center. Hence, the topology component management module 20 manages the number of terminals connectable to connection nodes for each component device to be placed in the single-line diagram (e.g. two circuit breaker terminals, one bus-bar terminal) and generation rules for connection nodes (e.g. names and instances such as alphanumeric characters).

Next, the topology conversion module 30 converts the single line diagram of the digital substation into an engineering topology conforming to international standards by use of conversion conditions stored in the topology component management module 20. The topology conversion module 30 utilizes the rules for connection nodes and the number of terminals connectable to connection nodes for each component device stored in the topology component management module 20 to represent the digital substation in a new form by reinterpreting the single-line diagram of the digital substation generated by the single line diagram generation module 10 from the perspective of an engineering topology conforming to international standards such as IEC 61850.

More specifically, the topology conversion module 30 converts the single line diagram of the digital substation into an engineering topology conforming to international standards by establishing connection relations between connection nodes (CN) and terminals for individual objects included in the single-line diagram of the digital substation and representing the connection relations on a drawing in the form of an engineering topology conforming to international standards. This conversion process is described in detail with reference to FIG. 3 and FIG. 4.

Figure 3:
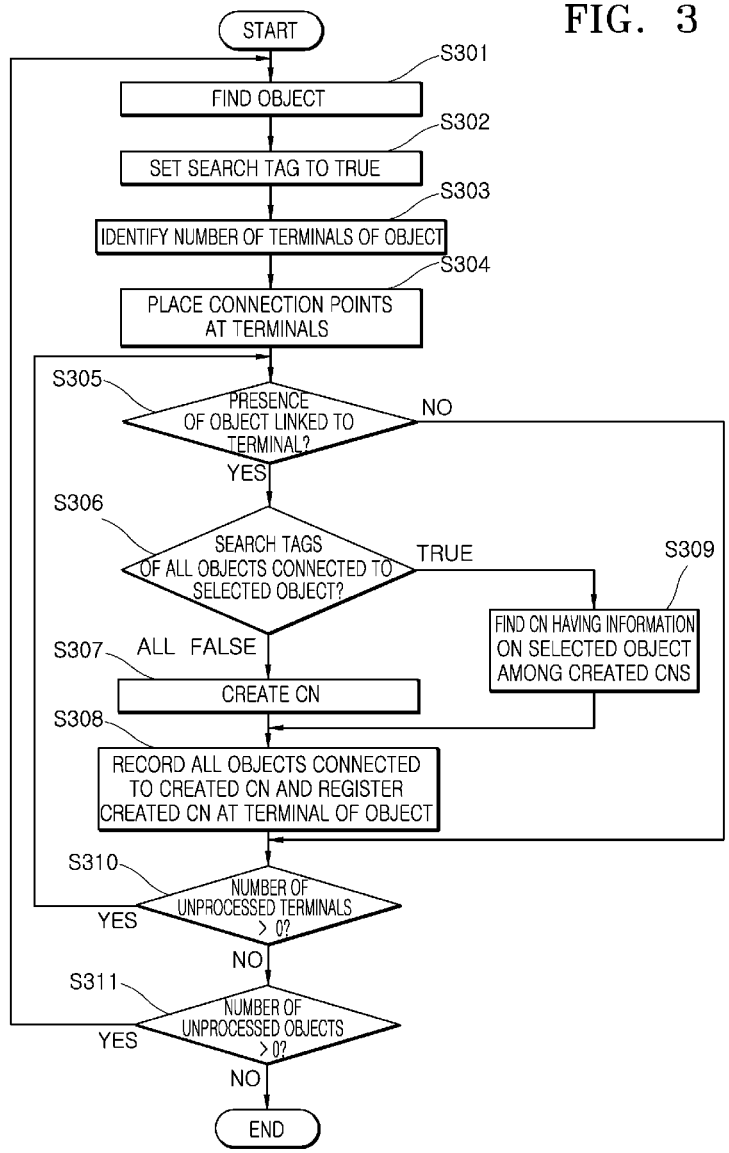
FIG. 3 is a flowchart of a procedure for creating linkage between connection nodes (CN) and terminals for individual objects included in a single-line diagram of a digital substation in the process of converting single-line diagrams of the digital substation into an engineering topology conforming to international standards according to the embodiment of the present invention.

FIG. 3 is a flowchart of a procedure for creating links between connection nodes (CN) and terminals for individual objects included in a single-line diagram of a digital substation in the process of converting single-line diagrams of the digital substation into an engineering topology conforming to international standards according to the embodiment of the present invention. Referring to FIG. 3, in operation S301, the topology conversion module 30 finds an object in a preset order on the single-line diagram and selects the found object, and, in operation S302, changes the search tag of the found object from "false" (unprocessed) to "true" (processed). Each object constituting the digital substation has a search tag (set to "false" by default) as an attribute, and the search tag of an object found by object search operation is set to "true".

In operation S303, the topology conversion module 30 retrieves the number of terminals for the selected object from the topology component management module 20, and, in operation S304, places connection points between objects of the single-line diagram on the terminals, so that adjacent objects connected to the terminals are identified.

In operation S305, the topology conversion module 30 checks whether an object connected to the terminal of the selected object is present. If such an object is present, in operation S306, the topology conversion module 30 examines search tags of all objects connected to the selected object. If all the search tags are set to "false", in operation S307, the topology conversion module 30 creates a connection node (CN) according to the preset generation rules, and, in operation S308, stores information regarding all objects connected to the terminal of the selected object at the created connection node and records the created connection node at the terminal of the selected object. Conversely, if a search tag set to "true" is present, in operation S309, the topology conversion module 30 finds a connection node having information on the selected object among created connection nodes, and, in operation S308, configures settings so that the found connection node is linked with the terminal of the selected object.

Thereafter, in operation S310, the topology conversion module 30 checks whether an unprocessed terminal is present among terminals of the selected object. If an unprocessed terminal is present, the topology conversion module 30 repeats operations S305 to S309. If all the terminals of the selected object have been processed, the procedure proceeds to operation S311. In operation S311, the topology conversion module 30 checks whether an unprocessed object is present. If an unprocessed object is present, the topology conversion module 30 repeats operations S301 to S310. If all the objects have been processed, the procedure ends. Through the above procedure, the topology conversion module 30 establishes connection relations between connection nodes (CN) and terminals for individual objects included in the single-line diagram of the digital substation in the process of converting single-line diagrams of the digital substation into an engineering topology conforming to international standards.

Figure 4:
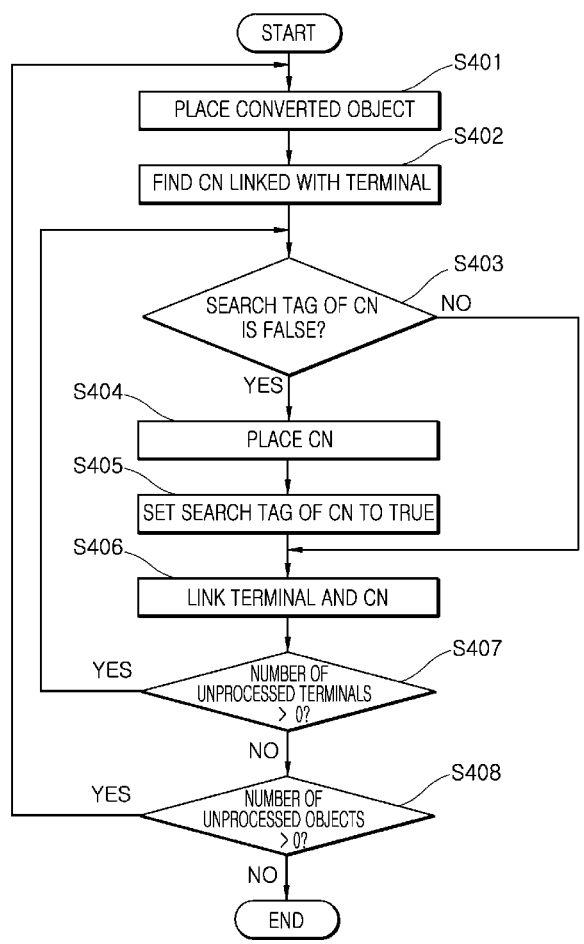
FIG. 4 is a flowchart of a procedure for representing linkage between connection nodes (CN) and terminals on a drawing in the form of an engineering topology conforming to international standards in the process of converting single-line diagrams of the digital substation into an engineering topology conforming to international standards according to the embodiment of the present invention.

Next, with reference to FIG. 4, a description is given of a procedure for representing connection relations between connection nodes (CN) and terminals on a drawing in the form of an engineering topology conforming to international standards in the process of converting single-line diagrams of the digital substation into an engineering topology conforming to international standards.

In operation S401, the topology conversion module 30 places an object contained in the single-line diagram of the digital substation on the drawing, and, in operation S402, finds a connection node (CN) linked with a terminal of the object.

In operation S403, the topology conversion module 30 examines the search tag of the found connection node linked with the terminal. If the search tag of the found connection node is set to "false" (unprocessed, i.e. the found connection node is not placed on the drawing yet), in operation S404, the topology conversion module 30 places the connection node on the drawing, and, in operation S405, sets the search tag of the connection node to "true". In operation S406, the topology conversion module 30 links the terminal to the placed connection node. If the search tag of the found connection node is not set to "false" in operation S403, the procedure proceeds to operation S406.

Thereafter, in operation S407, the topology conversion module 30 checks whether an unprocessed terminal is present among terminals of the object. If an unprocessed terminal is present, the topology conversion module 30 repeats operations S403 to S406. If all the terminals have been processed, the procedure proceeds to operation S408. In operation S408, the topology conversion module 30 checks whether an unprocessed object is present. If an unprocessed object is present, the topology conversion module 30 repeats operations S401 to S407. If all the objects have been processed, the procedure ends. Through the above procedure, the topology conversion module 30 represents connection relations between connection nodes and terminals on a drawing in the form of an engineering topology conforming to international standards in the process of converting single-line diagrams of the digital substation into an engineering topology conforming to international standards.

Figure 5:
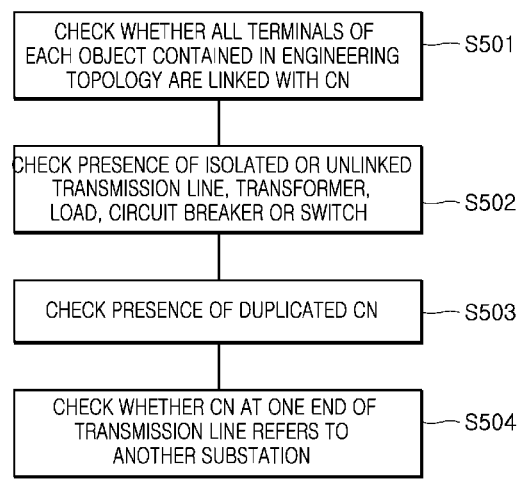
FIG. 5 is a flowchart of a method for verifying whether an engineering topology is suitable for the digital substation according to the embodiment of the present invention.

In addition, after the topology conversion module 30 converts the single-line diagram of the digital substation into an engineering topology conforming to international standards, the topology verification module 40 verifies whether the engineering topology is suitable for the digital substation based on the international standards. This verification is described in detail with reference to FIG. 5. FIG. 5 is a flowchart of a method for verifying whether an engineering topology is suitable for the digital substation based on international standards according to the embodiment of the present invention.

Referring to FIG. 5, in operation S501, the topology verification module 40 examines whether all terminals of each object contained in the generated engineering topology are linked with a connection node, and, in operation S502, examines whether an isolated object is present among objects contained in the single-line diagram of the digital substation. This is to find an error in topology composition by checking whether an isolated object (object not linked with another object) is present among objects constituting the substation such as a transmission line, transformer, load, circuit breaker and switch.

Thereafter, in operation S503, the topology verification module 40 examines whether a duplicate connection node is present in the generated engineering topology, and, in operation S504, examines whether the connection node at one end of a transmission line refers to another substation at the other end.

Through the above procedure, the topology verification module 40 verifies whether the engineering topology is suitable for the digital substation based on international standards.

Finally, after the topology verification module 40 verifies whether the engineering topology is suitable for the digital substation based on international standards, the international standard file generation module 50 utilizes the verified engineering topology to generate a single line diagram engineering file for the digital substation as a system specification description (SSS).

As described hereinabove, according to the present invention, the method and device that generate an engineering topology of a digital substation allow engineering tasks for a digital substation based on international standards to be performed at the system level rather than at the existing level of a unit device, and enable power engineers to automatically generate an engineering topology of a digital substation conforming to complex international standards, making it possible to perform engineering design tasks for digital substations attracting worldwide attention in a rapid and accurate manner. The method and device that generate an engineering topology of a digital substation enable automatic generation of an engineering topology of the digital substation without separate tasks by use of existing single-line diagrams of the digital substation that can be readily drawn by substation engineers.

According to the present invention, analyzing and representing a digital substation in an engineering topology perspective may create an environment in which electric power flowing through the substation and streams of associated digital information can be seen by not only human engineers but also a computer system. Hence, higher layer operation systems and gateway systems monitoring the overall power of the digital substation and information flows therein may be independently implemented using the engineering topology information without separate tasks. Additionally, to build a supervisory control and data acquisition (SCADA) system serving as an immediate higher layer of the digital substation in accordance with international standards such as IEC 61970, the engineering topology of the digital substation may be adjusted to realize an engineering topology of the new SCADA system.

Although some embodiments have been described herein, it should be understood by those skilled in the art that various modifications, variations, and alterations can be made without departing from the spirit and scope of the present invention, as defined in the appended claims and their equivalents.

The invention claimed is:

1. A method for automatically generating an engineering topology of a digital substation conforming to international standards by using existing single line diagrams of the digital substation, comprising steps of:
   generating, by at least one processor, a single line diagram of the digital substation based on input information regarding a plurality of substation component devices and connection relations therebetween;
   converting, by the at least one processor, the single line diagram of the digital substation into an engineering topology conforming to international standards by use of pre-stored conversion conditions;
   verifying, by the at least one processor, whether the engineering topology is suitable for the digital substation based on the international standards; and
   generating, by the at least one processor, a single line diagram engineering file of the digital substation as a system specification description (SSS) by use of the verified engineering topology, wherein the step of converting the single line diagram into an engineering topology comprises steps of:

establishing connection relations between connection nodes (CN) and terminals for objects included in the single line diagram of the digital substation; and representing the connection relations on a drawing in the form of an engineering topology conforming to the international standards, wherein the step of establishing connection relations between connection nodes (CN) and terminals comprises steps of:

(a) finding an object on the single line diagram in a preset order;

(b) selecting the found object and changing a search tag of the found object from "false" (unprocessed) to "true" (processed);

(c) retrieving a pre-stored number of terminals for the selected object;

(d) placing connection nodes between the objects of the single line diagram on the terminals of the selected object;

(e) examining search tags of all objects connected to the selected object, when an object connected to a terminal of the selected object is present;

(f) creating one connection node according to preset generation rules for connection nodes, and storing information regarding all the objects connected to the terminal of the selected object at the created connection node, when all the examined search tags are set to "false" (unprocessed);

(g) finding a connection node having information on the selected object among created connection nodes, and linking the found connection node to the terminal of the selected object, when a search tag set to "true" (processed) among all the examined search tags is present;

(h) repeating, for all remaining unprocessed terminals of the selected object, the steps (e) to (g); and (i) repeating, for all remaining unprocessed objects, the steps (a) to (h).

2. The method of claim 1, wherein the step of representing the connection relations on a drawing comprises steps of:

(a) placing an object contained in the single line diagram of the digital substation on the drawing;

(b) finding a connection node (CN) linked with a terminal of the object;

(c) examining a search tag of the found connection node linked with the terminal;

(d) placing the connection node on the drawing when the search tag is set to "false" (unprocessed);

(e) linking the terminal with the placed connection node;

(f) repeating, for all remaining unprocessed terminals of the object, the steps (c) to (e); and (g) repeating, for all remaining unprocessed objects, the steps (a) to (f).

3. A method for automatically generating an engineering topology of a digital substation conforming to international standards by using existing single line diagrams of the digital substation, comprising steps of:

generating, by at least one processor, a single line diagram of the digital substation based on input information regarding a plurality of substation component devices and connection relations therebetween;

converting, by the at least one processor, the single line diagram of the digital substation into an engineering topology conforming to international standards by use of pre-stored conversion conditions;

verifying, by the at least one processor, whether the engineering topology is suitable for the digital substation based on the international standards; and generating, by the at least one processor, a single line diagram engineering file of the digital substation as a system specification description (SSS) by use of the verified engineering topology, wherein the step of converting the single line diagram into an engineering topology comprises steps of:

establishing connection relations between connection nodes (CN) and terminals for objects included in the single line diagram of the digital substation; and representing the connection relations on a drawing in the form of an engineering topology conforming to the international standards, wherein the step of establishing connection relations between connection nodes (CN) and terminals comprises steps of:

(a) finding an object on the single line diagram in a preset order;

(b) selecting the found object and changing a search tag of the found object from "false" (unprocessed) to "true" (processed);

(c) retrieving a pre-stored number of terminals for the selected object;

(d) placing connection nodes between the objects of the single line diagram on the terminals of the selected object;

(e) examining search tags of all objects connected to the selected object, when an object connected to a terminal of the selected object is present;

(f) creating one connection node according to preset generation rules for connection nodes, and storing information regarding all the objects connected to the terminal of the selected object at the created connection node, when all the examined search tags are set to "false" (unprocessed);

(g) finding a connection node having information on the selected object among created connection nodes, and linking the found connection node to the terminal of the selected object, when a search tag set to "true" (processed) among all the examined search tags is present;

(h) repeating, for all remaining unprocessed terminals of the selected object, the steps (e) to (g); and (i) repeating, for all remaining unprocessed objects, the steps (a) to (h), and wherein the step of verifying whether the engineering topology is suitable comprises steps of:

examining whether terminals of each object that are not linked to a corresponding connection node are present in the generated engineering topology;

examining whether an isolated object is present among objects contained in the single line diagram of the digital substation;

examining whether a duplicate connection node is present in the generated engineering topology; and examining whether the connection node at one end of a transmission line refers to another substation at the other end.

4. A method for automatically generating an engineering topology of a digital substation conforming to international standards by using existing single line diagrams of the digital substation, comprising steps of:

generating, by at least one processor, a single line diagram of the digital substation based on input information regarding a plurality of substation component devices and connection relations therebetween;

converting, by the at least one processor, the single line diagram of the digital substation into an engineering topology conforming to international standards by use of pre-stored conversion conditions;

verifying, by the at least one processor, whether the engineering topology is suitable for the digital substation based on the international standards; and generating, by the at least one processor, a single line diagram engineering file of the digital substation as a system specification description (SSS) by use of the verified engineering topology, wherein the step of converting the single line diagram into an engineering topology comprises steps of:

establishing connection relations between connection nodes (CN) and terminals for objects included in the single line diagram of the digital substation; and representing the connection relations on a drawing in the form of an engineering topology conforming to the international standards, wherein the step of establishing connection relations between connection nodes (CN) and terminals comprises steps of:

(a) finding an object on the single line diagram in a preset order;

(b) selecting the found object and changing a search tag of the found object from "false" (unprocessed) to "true" (processed);

(c) retrieving a pre-stored number of terminals for the selected object;

(d) placing connection nodes between the objects of the single line diagram on the terminals of the selected object;

(e) examining search tags of all objects connected to the selected object, when an object connected to a terminal of the selected object is present;

(f) creating one connection node according to preset generation rules for connection nodes, and storing information regarding all the objects connected to the terminal of the selected object at the created connection node, when all the examined search tags are set to "false" (unprocessed);

(g) finding a connection node having information on the selected object among created connection nodes, and linking the found connection node to the terminal of the selected object, when a search tag set to "true" (processed) among all the examined search tags is present;

(h) repeating, for all remaining unprocessed terminals of the selected object, the steps (e) to (g); and (i) repeating, for all remaining unprocessed objects, the steps (a) to (h), and wherein the at least one processor manages generation rules for connection nodes and a number of terminals connectable to the connection nodes.

5. A device for automatically generating an engineering topology of a digital substation conforming to international standards by using existing single line diagrams of the digital substation, the device comprising at least one processor configured to:

generate a single line diagram of the digital substation based on input information regarding a plurality of substation component devices and connection relations therebetween;

convert the single line diagram of the digital substation into an engineering topology conforming to international standards by use of pre-stored conversion conditions;

verify whether the engineering topology is suitable for the digital substation based on the international standards; and generate a single line diagram engineering file of the digital substation as a system specification description (SSS) by use of the verified engineering topology, wherein, for conversion of the single line diagram into the engineering topology, the at least one processor is further configured to establish connection relations between connection nodes (CN) and terminals for objects included in the single line diagram of the digital substation, and represent the connection relations on a drawing in the form of an engineering topology conforming to the international standards, wherein, for establishing connection relations between connection nodes (CN) and terminals, the at least one processor is configured to:

(a) find an object on the single line diagram in a preset order;

(b) select the found object and change a search tag of the found object from "false" (unprocessed) to "true" (processed);

(c) retrieve a pre-stored number of terminals for the selected object;

(d) place connection nodes between the objects of the single line diagram on the terminals of the selected object;

(e) examine search tags of all objects connected to the selected object, when an object connected to a terminal of the selected object is present;

(f) create one connection node according to preset generation rules for connection nodes, and store information regarding all the objects connected to the terminal of the selected object at the created connection node, when all the examined search tags are set to "false" (unprocessed);

(g) find a connection node having information on the selected object among created connection nodes, and link the found connection node to the terminal of the selected object, when a search tag set to "true" (processed) among all the examined search tags is present;

(h) repeat, for all remaining unprocessed terminals of the selected object, the steps (e) to (g); and (i) repeat, for all remaining unprocessed objects, the steps (a) to (h), and wherein, for representation of the connection relations on a drawing, the at least one processor is further configured to place an object contained in the single line diagram of the digital substation on the drawing, finds a connection node (CN) linked with a terminal of the object, examines a search tag of the found connection node linked with the terminal, and places, when the search tag is set to "false" (unprocessed), the connection node on the drawing and links the terminal and the placed connection node together.

6. The device of claim 5, wherein, for representing the connection relations on the drawing, the at least one processor is configured to:

(a) place an object contained in the single line diagram of the digital substation on the drawing;

(b) find a connection node (CN) linked with a terminal of the object;

(c) examine a search tag of the found connection node linked with the terminal;

(d) place the connection node on the drawing when the search tag is set to "false" (unprocessed);
(e) link the terminal with the placed connection node;
(f) repeat, for all remaining unprocessed terminals of the object, the steps (c) to (e); and
(g) repeat, for all remaining unprocessed objects, the steps (a) to (f), and wherein the at least one processor is further configured to examine whether terminals of each object that are not linked to a corresponding connection node are present in the generated engineering topology, examine whether an isolated object is present among the objects contained in the single line diagram of the digital substation, examine whether a duplicate connection node is present in the generated engineering topology, and examine whether the connection node at one end of a transmission line refers to another substation at the other end.

7. A device for automatically generating an engineering topology of a digital substation conforming to international standards by using existing single line diagrams of the digital substation, the device comprising at least one processor configured to:

generate a single line diagram of the digital substation based on input information regarding a plurality of substation component devices and connection relations therebetween;

convert the single line diagram of the digital substation into an engineering topology conforming to international standards by use of pre-stored conversion conditions;

verify whether the engineering topology is suitable for the digital substation based on the international standards; and generate a single line diagram engineering file of the digital substation as a system specification description (SSS) by use of the verified engineering topology, wherein, for conversion of the single line diagram into the engineering topology, the at least one processor is further configured to establish connection relations between connection nodes (CN) and terminals for objects included in the single line diagram of the digital substation, and represents the connection relations on a drawing in the form of an engineering topology conforming to the international standards, wherein, for establishing connection relations between connection nodes (CN) and terminals, the at least one processor is configured to:

(a) find an object on the single line diagram in a preset order;
(b) select the found object and change a search tag of the found object from "false" (unprocessed) to "true" (processed);
(c) retrieve a pre-stored number of terminals for the selected object;
(d) place connection nodes between the objects of the single line diagram on the terminals of the selected object;
(e) examine search tags of all objects connected to the selected object, when an object connected to a terminal of the selected object is present;
(f) create one connection node according to preset generation rules for connection nodes, and store information regarding all the objects connected to the terminal of the selected object at the created connection node, when all the examined search tags are set to "false" (unprocessed);
(g) find a connection node having information on the selected object among created connection nodes, and link the found connection node to the terminal of the selected object, when a search tag set to "true" (processed) among all the examined search tags is present;
(h) repeat, for all remaining unprocessed terminals of the selected object, the steps (e) to (g); and
(i) repeat, for all remaining unprocessed objects, the steps (a) to (h), and wherein the at least one processor manages generation rules for connection nodes and a number of terminals connectable to the connection nodes.

* * * * *